United States Patent [19]

Chang et al.

[11] Patent Number: 4,943,545

[45] Date of Patent: Jul. 24, 1990

[54] ACTIVATION OF ZEOLITES

[75] Inventors: Clarence D. Chang, Princeton; Scott Han; Bruce P. Pelrine, Lawrenceville, all of N.J.

[73] Assignee: Mobil Oil Corporation, New York, N.Y.

[21] Appl. No.: 258,090

[22] Filed: Oct. 14, 1988

Related U.S. Application Data

[63] Continuation of Ser. No. 60,542, Jun. 11, 1987, abandoned, which is a continuation-in-part of Ser. No. 59,368, Jun. 8, 1987, abandoned.

[51] Int. Cl.$^5$ .................. B01J 29/38; B01J 29/08; B01J 29/28; B01J 37/26
[52] U.S. Cl. .................... 502/56; 208/120; 423/328; 502/25; 502/27; 502/65; 502/71; 502/77; 502/85; 502/86
[58] Field of Search ................. 502/25-27, 502/64, 71, 77, 85, 86; 423/328

[56] References Cited

U.S. PATENT DOCUMENTS

| | | | |
|---|---|---|---|
| 3,630,965 | 12/1971 | Voorhies et al. | 252/442 |
| 3,702,312 | 11/1972 | Wilson | 252/442 |
| 3,933,983 | 1/1976 | Elliott, Jr. | 502/86 |
| 3,997,474 | 12/1976 | Miale | 252/450 |
| 4,414,189 | 11/1983 | Kokotailo et al. | 502/85 |
| 4,427,786 | 1/1984 | Miale et al. | 502/61 |
| 4,427,787 | 1/1984 | Miale et al. | 502/71 |
| 4,427,788 | 1/1984 | Miale et al. | 502/71 |
| 4,427,789 | 1/1984 | Miale et al. | 502/71 |
| 4,427,790 | 1/1984 | Miale et al. | 502/71 |
| 4,444,902 | 4/1984 | Chang et al. | 502/86 |
| 4,477,582 | 10/1984 | Miale | 502/56 |
| 4,596,704 | 6/1986 | Miale et al. | 502/86 |
| 4,678,763 | 7/1987 | Chang et al. | 502/26 |
| 4,678,766 | 7/1987 | Rosinski | 502/85 |
| 4,753,910 | 6/1988 | Han et al. | 502/85 |

FOREIGN PATENT DOCUMENTS

| | | |
|---|---|---|
| 0072920 | 3/1983 | European Pat. Off. . |
| 0108611 | 5/1983 | European Pat. Off. . |
| 2010496 | 3/1969 | Fed. Rep. of Germany . |

Primary Examiner—Paul E. Konopka
Attorney, Agent, or Firm—Alexander J. McKillop; Charles J. Speciale; Marina V. Schneller

[57] ABSTRACT

Zeolitic catalysts containing framework displaced aluminum, e.g., steamed or spent catalysts, are activated by contact with aqueous fluoride solution under mild conditions. The treatment can enhance catalytic activity, ion-exchange capacity and crystallinity by replacing aluminum in the zeolitic framework.

15 Claims, No Drawings

ACTIVATION OF ZEOLITES

This application is a continuation of Ser. No. 060,542, filed June 11, 1987 (now abandoned), which in turn is a continuation-in-part of Ser. No. 059,368, filed June 8, 1987 (now abandoned).

This invention relates to a method for reinserting framework displaced aluminum in a zeolite framework. The present invention further relates to a method for activating a catalyst composition comprising a framework aluminum-deficient crystalline aluminosilicate zeolite which comprises contacting the catalyst with dilute aqueous fluoride solution which is essentially free from framework substituting atoms, under mild conditions. Zeolites deactivated by steam or hydrocarbon conversion processes are particularly suited to activation by the method of the present invention.

Methods for enhancing the catalytic activity of zeolitic materials are well known, including treatments involving fluorine. U.S. Pat. No. 4,444,902 relates to a process for enhancing acidic activity of a highly siliceous zeolite by contact with aluminum fluoride followed by ammonium exchange and calcination. U.S. Pat. No. 4,427,787 teaches zeolite activation by contacting an alumina-composited zeolite with hydrogen fluoride. Ammoniacal aluminum fluoride is taught as a reagent for zeolite activation in U.S. Pat. No. 4,427,788 while U.S. Pat. No. 4,427,789 treats alumina-composited zeolite with alkali metal fluoride. U.S. Pat. No. 4,427,790 treats enhancing zeolite activity by treatment with a compound of the formula $L_{(n-m)}[MF_n]_e$ wherein L is an organic or inorganic ionic moiety $[MF_n]$ is a fluoroanion moiety wherein M is a Group VB, VIB, VIIB, VIII, IIIA, IVA or VA element, n is the coordination number of M, m is the valence of M and e is the charge associated with L. U.S. Pat. No. 4,427,786 teaches the use of boron fluoride in activating an alumina- or gallia-supported zeolite. All of the above references utilize added aluminum or other activating elements in activating zeolites.

U.S. patent application Ser. No. 704,694, filed Feb. 22, 1985, now U.S. Pat. No. 4,678,766, utilizes an aqueous ammonium flouride solution to enhance catalytic dewaxing selectivity of an oxygen calcined zeolite. This reference teaches that n-hexane cracking catalytic activity can be reduced by such fluoride treatment. All of the above references are incorporated herein by reference.

It has now been found that a catalyst comprising framework aluminum-deficient crystalline aluminosilicate zeolite which contains non-framework aluminum can be activated by a method which comprises contacting said catalyst composition with an aqueous fluoride solution which is essentially free from framework substituting atoms, i.e. trivalent or tetravalent atoms such as those of Groups IIIA and IVA of the Periodic Table, capable of incorporation into the zeolite framework, e.g., Al, B or Si, . The fluoride solution can be from about 0.001 to 10 N, preferably about 0.01 to 0.1 N (equivalents of fluoride ion/liter). Contacting occurs under mild conditions such as a temperature of about 20° to 100° C., preferably about 60° to 95° C. for about 0.1 to 48 hours, preferably about 6 to 18 hours. The fluoride solution contacted catalyst composition may then be contacted with an aqueous ammonium ion solution of from about 0.05N to 5N, preferably 0.5 to 2.0 N, at a temperature of from about 20° C. to 100° C., preferably about 25° to 50° C., for a period sufficient to effect ammonium exchange, say 0.25 to 6 hours, preferably 0.5 to 3 hours. The aqueous ammonium ion solution contacted catalyst composition may then be calcined at a temperature of from about 200° to about 600° C., preferably about 500° to 550° C., for about 1 minute to 48 hours, preferably about 0.5 to 6 hours, in order to convert the zeolite to the hydrogen form.

The aqueous fluoride solution employed in the present invention contains no intentionally added source of framework substituting atoms and can be prepared from a fluoride compound selected from the group consisting of ammonium fluoride ($NH_4F$), hydrofluoric acid (HF), and ammonium hydrogen fluoride ($NH_4F.HF$), preferably ammonium hydrogen fluoride. The presence of framework substituting atoms is not required insofar as the present invention utilizes non-framework aluminum already present in the zeolite as an activating metal. The catalyst composition treated by the method of the present invention may be one which has been previously utilized in an organic feedstock or hydrocarbon conversion under conditions sufficient to deactivate said composition by removal of aluminum from said zeolite framework. In another aspect of the invention, the catalyst composition treated by the present method is one which has been previously contacted with steam under conditions sufficient to deactivate the composition by removal of aluminum from the zeolite framework. Such deactivation can occur under conditions of about 500° to 1700° F., for less than 1 hour to 1 week, at 50 ppm $H_2O$ to 1 atm $H_2O$, and an overall pressure of less than 1 atm pressure to 3000 atm.

The fluoride solution employed has an acidic character. The initial pH thereof may range from about 0.1 to 6, preferably about 2 to 4 whereas by the end of the fluoride contacting step it may increase to a pH between about 2 to 8, preferably between about 4 to about 7. The present invention is of particular interest in that it does not rely upon added aluminum or any other added framework incorporatable element to enhance activity. Instead, it is believed that non-framework aluminum atoms already associated with the zeolite, are inserted into the zeolitic framework, thereby enhancing acidic activity. These non-framework atoms can include those which have been displaced from the aluminosilicate as a result of exposure of the catalyst to conversion conditions including oxidative regeneration or steaming. Conversion process conditions which can result in such aluminum displacement include exposure to temperatures greater than 500° F. for less than 1 hour to 1 week in the presence of 50 ppm $H_2O$ to 1 atm $H_2O$ at less than 1 atm to 3000 atm overall pressure.

Zeolitic materials, both natural and synthetic, have been demonstrated in the past to have catalytic properties for various types of hydrocarbon conversion. Certain zeolitic materials are ordered, porous, crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite beta (U.S. Pat. No. 3,308,069), zeolite ZK-5 (U.S. Pat. No. 3,247,195), zeolite ZK-4 (U.S. Pat. No. 3,314,752), zeolite ZSM-5 (U.S. Pat. No. 3,702,886) ZSM-5/ZSM-11 intermediate (U.S. Pat. No. 4,229,424) zeolite ZSM-23 (U.S. Pat. No. 4,076,842), zeolite ZSM-11 (U.S. Pat. No. 3,709,979), zeolite ZSM-12 (U.S. Pat. No. 3,832,449), zeolite ZSM-20 (U.S. Pat. No. 3,972,983) ZSM-35 (U.S. Pat. No. 4,016,245), ZSM-38 (U.S. Pat. No. 4,046,859), and zeolite ZSM-48 (U.S. Pat. No. 4,375,573), merely to name a few. All of the above patents are incorporated herein by reference.

The silicon/aluminum atomic ratio of a given zeolite is often variable. For example, zeolite X can be synthesized with silicon/aluminum atomic ratios of from 1 to 1.5; zeolite Y, from 1.5 to about 3. In some zeolites, the upper limit of the silicon/aluminum atomic ratio is unbounded. ZSM-5 is one such example wherein the silicon/aluminum atomic ratio is at least 2.5 and up to infinity. U.S. Pat. No. 3,941,871 (Re. 29,948) discloses a porous crystalline silicate made from a reaction mixture containing no deliberately added aluminum in the recipe and exhibiting the X-ray diffraction pattern characteristic of ZSM-5 type zeolites. U.S. Pat. Nos. 4,061,724, 4,073,865 and 4,104,294 describe crystalline silicas of varying aluminum and metal content.

When zeolitic catalysts are utilized in organic conversion processes their catalytic activity is often diminished when they are subjected to deactivating conditions such as steaming or oxygen regeneration which are believed to result in displacement of aluminum from the zeolite framework. Highly siliceous aluminosilicate zeolites are particularly susceptible to such deactivation because they initially contain only relatively small amounts of aluminum in the framework. Accordingly, the present invention while suitable for aluminosilicates in general, is particularly useful in the activation of highly siliceous zeolites, i.e., zeolites having a silica to alumina molar ratio of at least about 4, preferably at least about 12, say, at least about 26, e.g., at least about 100.

Large pore size zeolites having a constraint index (C.I.) of less than 1, e.g., zeolites X, Y, mordenite, Ultrastable Zeolite Y (USY) and ZSM-20, can be activated by the method of the present invention. Intermediate pore size zeolites having a constraint index of about 1 to 12, e.g., ZSM-5, ZSM-5/ZSM-11 intermediate, ZSM-12, ZSM-23, ZSM-35, ZSM-38 and ZSM-48, are also suitable for treatment by the method of the present invention. An important characteristic of the crystal structure of these intermediate pore size crystalline aluminosilicates is that they provide constrained access to, and egress from, the intracrystalline free space by virtue of having a pore dimension greater than about 5 Angstroms and pore windows of about a size such as would be provided by 10 membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred zeolites useful in this invention possess, in combination, an $XO_4$ to $YO_4$ mole ratio, i.e., a silica to alumina mole ratio, of at least about 12; and a structure providing constrained access to the crystalline free space.

The members of this class of intermediate pore size zeolites have an effective pore size of generally from about 5 to about 8 angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of the particular porous crystalline silicate solely from theoretical structural considerations.

A convenient measure of the extent to which a zeolite provides control to molecules of varying sizes to its internal structure is the Constraint Index of the porous crystalline silicate. Porous crystalline aluminosilicates which provide a highly restricted access to and egress from its internal structure have a high value for the Constraint Index, and zeolites of this kind have pores of small size, e.g., less than 5 angstroms. On the other hand, porous crystalline aluminosilicates which provide relatively free access to the internal porous crystalline silicate structure have a low value for the Constraint Index, and usually pores of large size, e.g., greater than 8 angstroms. This method by which Constraint Index is determined is described fully in U.S. Pat. No. 4,016,218, incorporated herein by reference for details of the method.

Constraint Index (CI) values for some typical materials are:

|  | CI (at test temperature) |
| --- | --- |
| ZSM-4 | 0.5 (316° C.) |

-continued

| | CI (at test temperature) |
|---|---|
| ZSM-5 | 6–8.3 (371° C.–316° C.) |
| ZSM-11 | 5–8.7 (371° C.–316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-38 | 2 (510° C.) |
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica—alumina | 0.6 (538° C.) |
| Dealuminized Y | 0.5 (510° C.) |
| Erionite | 38 (316° C.) |
| Zeolite Beta | 0.6–2.0 (316° C.–399° C.) |

It should be noted that Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g., temperature, as to establish more than one value for the Constraint Index of a particular porous crystalline aluminosilicate. This explains the range of Constraint Indices for some zeolites, such as ZSM-5, ZSM-11 and Beta.

It is to be realized that the above CI values typically characterize the specified porous crystalline aluminosilicates, but that such are the cumulative result of several variables useful in the determination and calculation thereof. Thus, for a given zeolite exhibiting a CI value within the range of 1 to 12, depending on the temperature employed during the test method within the range of 290° C. to about 538° C., with accompanying conversion between 10% and 60%, the CI may vary within the indicated range of 1 to 12. Likewise, other variables such as the crystal size of the porous crystalline aluminosilicate, the presence of possibly occluded contaminants and binders intimately combined with the zeolite may affect the CI. It will accordingly be understood to those skilled in the art that the CI, as utilized herein, while affording a highly useful means for characterizing certain porous crystalline aluminosilicates of interest is approximate, taking into consideration the manner of its determination, with the possibility, in some instances, of compounding variable extremes.

The catalyst composition comprising zeolite which contains framework aluminum-deficient zeolite may be composed of the crystalline zeolite alone or said zeolite and a matrix comprising another material normally resistant to the temperature and other conditions employed in a chemical conversion process. Such matrix material is useful as a binder and imparts greater resistance to the catalyst for the severe temperature, pressure and reactant feed stream velocity conditions encountered in many processes, such as, for example, cracking. Useful matrix materials include both synthetic and naturally occurring substances, as well as inorganic materials such as clay, silica and/or metal oxides such as alumina. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composite with a porous matrix material, such as silica-alumina, silica-magnesia, silica-zirconia, silica-thorida, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic matrix, on an anhydrous basis, may vary widely with the zeolite content ranging from about 1 to about 99 percent by weight and more usually in the range of from about 5 to about 80 percent by weight of the dry composite.

Treatment with the dilute aqueous fluoride solution by the present invention has been found to enhance not only catalytic activity, Bronsted acidity and ion exchange capacity, but crystallinity of the zeolite as well.

In general, organic compounds such as, for example, those selected from the group consisting of hydrocarbons, alcohols and ethers, are converted to conversion products such as, for example, aromatics and lower molecular weight hydrocarbons, over the catalyst composition activated as described above by contact under organic compound conversion conditions including a temperature of from about 100° C. to about 800° C., a pressure of from about 0.1 atmosphere (bar) to about 200 atmospheres, a weight hourly space velocity of from about 0.08 $hr^{-1}$ to about 2000 $hr^{-1}$ and a hydrogen/feedstock organic, e.g., hydrocarbon, compound mole ratio of from 0 (no added hydrogen) to about 100.

Such conversion processes include, as non-limiting examples, cracking hydrocarbons with reaction conditions including a temperature of from about 300° C., to about 700° C., a pressure of from about 0.1 atmosphere (bar) to about 30 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g., benzene, toluene and xylenes, with reaction conditionsincluding a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g., methanol, or ethers, e.g., dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g., benzene and alkylbenzenes, in the presence of an alkylating agent, e.g., olefins, formaldehyde, alkylhalides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 290° C. to about 500° C., a pressure of from about atmospheric to about 200 atmospheres, a weight hourly space velocity of from about 10 to about 10000 and an aromatic hydrocarbon/polyalkylaromatic hydrocarbon mole ratio of from about 1/1 to about 16/1.

In order to more fully illustrate the nature of the invention and the manner of practicing same, the following examples are presented. In the examples, whenever Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha Test is described in U.S. Pat. No. 3,354,078 and in *The Journal of Catalysis*, Vol. IV, pp. 527–529 (Aug. 1965), each incorporated herein by reference as to that description.

EXAMPLE 1

Rejuvenation of Steam-Deactivated Ammonium-Exchanged Ultrastable Zeolite Y 3 g of a steamed ammonium-exchanged ultrastable zeolite Y starting material were combined with 100 ml of 3.4 M aqueous ammonium acetate forming a buffered solution whose pH is maintained at a pH slightly higher than the initial pH. The resulting mixture was slurried and heated to 75° C.. To this slurry were added slowly 50 ml of a solution 0.02 M in $NH_4F$ and 0.04 M in HF. This solution had a pH between 2–4 and the addition was in 1 ml increments over a period of 2 hours. The solution was stirred and allowed to react overnight at 75° C. The final pH of the solution was between 6–7. The product was filtered, exchanged with ammonium nitrate, and calcined at 538° C. for 360 minutes in an $N_2/O_2$ atmosphere.

The unsmoothed x-ray powder diffraction patterns for the product versus the starting material contained their six strongest peaks between 15° and 32° compared for the product and starting material. From this calculation, the crystallinity of the product was determined to be 9% higher than that of the parent.

The hexane cracking activities of the starting and product samples are respectively given in Tables 1 and 2 below. The treated ultra-stable Y samples showed substantial increase in alpha. The ammonium exchange capacity as measured by temperature programmed desorption, thermogravimetric analysis (TPD, TGA) showed a calculated drop in $SiO_2Al_2O_3$ molar ratio from 22 to 19 for the parent to product. These data are consistent with aluminum reinsertion into the zeolite. This example clearly demonstrates reactivation of a steam deactivated catalyst.

EXAMPLE 2

Rejuvenation of a Spent Alumina-Bound ZSM-5 Catalytic Lube Dewaxing Catalyst

The following is an example of rejuvenation of a spent lube dewaxing catalyst. 3.5 g of an alumina bound ZSM-5 catalyst which had experienced 6 cycles in a catalytic lube dewaxing unit with $H_2/O_2$ regenerations were treated with 57 ml of 0.044 ammonium hydrogen fluoride ($NH_4F.HF$, pH =4) at 85° C. overnight (18 h). The resultant catalyst was ammonium exchanged and calcined.

The alpha of the product was 162 whereas the untreated original catalyst had alpha =102. Prior to the six cycles of catalytic lube dewaxing the catalyst had an alpha value of 123. Clearly, this spent catalyst was rejuvenated by fluoride treatment.

TABLE 1

| Hexane Cracking Activities for Untreated Ultrastable Y Zeolite | | | | | | | | |
|---|---|---|---|---|---|---|---|---|
| Clock Time (Hr:Min) | GC | GC Counts | Temp Deg. C. | Flow CC/Min | % Conv | Benzene Selectivity | Alpha Value | Alpha 538° C. |
| 0:42 | G25463 | 700 | 536 | 117.63 | 18.46 | 0.00 | 365.5 | 373.3 |
| 0:52 | G25464 | 707 | 536 | 117.01 | 15.59 | 0.53 | 304.2 | 311.8 |
| 1:02 | G25465 | 707 | 536 | 116.59 | 13.91 | 0.65 | 269.4 | 275.1 |
| 1:11 | G25466 | 754 | 536 | 116.28 | 12.94 | 0.70 | 249.6 | 254.9 |
| 1:21 | G25467 | 758 | 537 | 115.99 | 12.10 | 0.75 | 232.6 | 236.8 |
| 1:31 | G25468 | 714 | 537 | 115.73 | 11.45 | 0.81 | 219.7 | 223.6 |

Catalyst Wt. - 0.0395 Grams
Based on 100 Pct. Ash and 100 Pct. Zeolite
*Alpha Corrected to 538° C. based on −23 Kcal/Mole

TABLE 2

Hexane Cracking Activities for Fluoride Treated Ultrastable Y Zeolite

| Clock Time (Hr:Min) | GC | GC Counts | Temp Deg C. | Flow CC/Min | % Conv | Benzene Selectivity | Alpha Value | Alpha 538° C. |
| --- | --- | --- | --- | --- | --- | --- | --- | --- |
| 22:31 | G25457 | 682 | 538 | 119.61 | 31.41 | 0.29 | 666.7 | 660.9 |
| 22:41 | G25458 | 695 | 537 | 118.32 | 24.15 | 0.39 | 486.9 | 489.5 |
| 22:51 | G25459 | 681 | 537 | 117.68 | 20.99 | 0.46 | 414.8 | 417.0 |
| 23:01 | G25460 | 709 | 537 | 117.20 | 18.93 | 0.50 | 369.3 | 371.3 |
| 23:12 | G25461 | 695 | 538 | 116.82 | 17.55 | 0.52 | 339.5 | 339.5 |
| 23:22 | G25462 | 726 | 538 | 116.48 | 16.48 | 0.57 | 316.9 | 316.9 |

Catalyst Wt. - 0.400 Grams
Based on 100 Pct. Ash and 100 Pct. Zeolite
*Alpha Corrected to 538° C. Based on −23 Kcal/Mole It is claimed:

1. A method of activation a catalyst composition comprising a framework aluminum-deficient crystalline aluminosilicate zeolite containing non-framework aluminum which comprises providing said aluminum-deficient zeolite, which as been deactivated by removal of aluminum from said framework, during exposure to at least one gas selected from the group consisting of oxygen and steam, under conditions effective to remove said aluminum from said framework contacting said catalyst composition with a dilute aqueous fluoride solution of from about 0.001 to 0.1 N, wherein said solution is essentially free of zeolite framework substituting atoms at a temperature of about 20 to 100° C. for about 0.1 to 48 hours, wherein said fluoride solution is prepared from at least one fluoride reagent selected from the group consisting of, ammonium hydrogen fluoride and a mixture of ammonium fluoride and hydrogen fluoride converting said fluoride solution treated catalyst to its ammonium exchanged form, thereafter calcining said converted catalyst, wherein said catalyst composition treated by said method has been previously utilized in an organic compound conversion or contacted with steam, under conditions sufficient to deactivate said composition by removal of aluminum from said zeolite framework; and recovering said zeolite which exhibits a hexane cracking activity greater than that of the aluminum-deficient zeolite.

2. The method of claim 1 wherein said fluoride solution contacted catalyst composition is converted to its ammonium exchanged form under conditions including contact with an aqueous ammonium ion solution of from about 0.05N to 5N at a temperature of from about 20° C. to 100° C. for from about 0.25 to 6 hours.

3. The method of claim 2 which includes calcining said aqueous ammonium ion solution contacted catalyst composition at a temperature of from about 200° to about 600° C. for about 1 minute to 48 hours.

4. The method of claim 3 wherein said contacting with fluoride solution is with a fluoride solution of from about 0.01 to 0.1 N at a temperature of from about 60° to 95° C. for about 6 to 18 hours.

5. The method of claim 4 wherein said contacting with aqueous ammonium ion solution is with an ammonium ion solution of about 0.5 to 2 N, a temperature of from about 25° to 50° C., for from about 0.5 to 3 hours, and said calcining occurs at a temperature of from about 500° to about 550° C. for about 0 to 6 hours.

6. The method of claim 3 wherein said zeolite has a silica to alumina molar ratio of at least about 4.

7. The method of claim 4 wherein said zeolite has a silica to alumina molar ratio of at least about 26.

8. The method of claim 3 wherein said zeolite is selected from the group consisting of large pore structure zeolites exhibiting a Constraint Index of less than about 1 and intermediate pore structure zeolites exhibiting a Constraint Index of from about 1 to 12.

9. The method of claim 8 wherein said zeolite is a zeolite selected from the group consisting of zeolite Y, Ultrastable Y, zeolite X, and mordenite.

10. The method of claim 8 wherein said zeolite is a zeolite selected from the group consisting of ZSM-5, ZSM-11, ZSM-12, ZSM-23, ZSM-35, ZSM-38, ZSM-48 and zeolite beta.

11. The method of claim 3 wherein said activation is carried out in the absence of added aluminum.

12. The method of claim 3 wherein said catalyst composition is a composition of said zeolite and an inorganic oxide matrix.

13. The method of claim 3 wherein said catalyst composition is a composite of said zeolite and an inorganic oxide matrix.

14. The method of claim 9 wherein the hexane cracking activity is measured as the alpha value and wherein the alpha value of said catalyst composition is increased.

15. The method of claim 9 wherein the crystallinity of said catalyst composition is increased.

* * * * *

UNITED STATES PATENT AND TRADEMARK OFFICE
CERTIFICATE OF CORRECTION

PATENT NO. : 4,943,545

DATED : July 24, 1990

INVENTOR(S) : Clarence D. Chang, et al

It is certified that error appears in the above-identified patent and that said Letters Patent is hereby corrected as shown below:

Column 9, line 23, change "as" to --has--.

Signed and Sealed this

Twentieth Day of April, 1993

*Attest:*

MICHAEL K. KIRK

*Attesting Officer*      Acting Commissioner of Patents and Trademarks